April 11, 1961 R. L. SPALDING 2,979,371
ART OF MAKING AND TESTING GETTERED ELECTRON TUBES
Original Filed Dec. 11, 1959 2 Sheets-Sheet 2

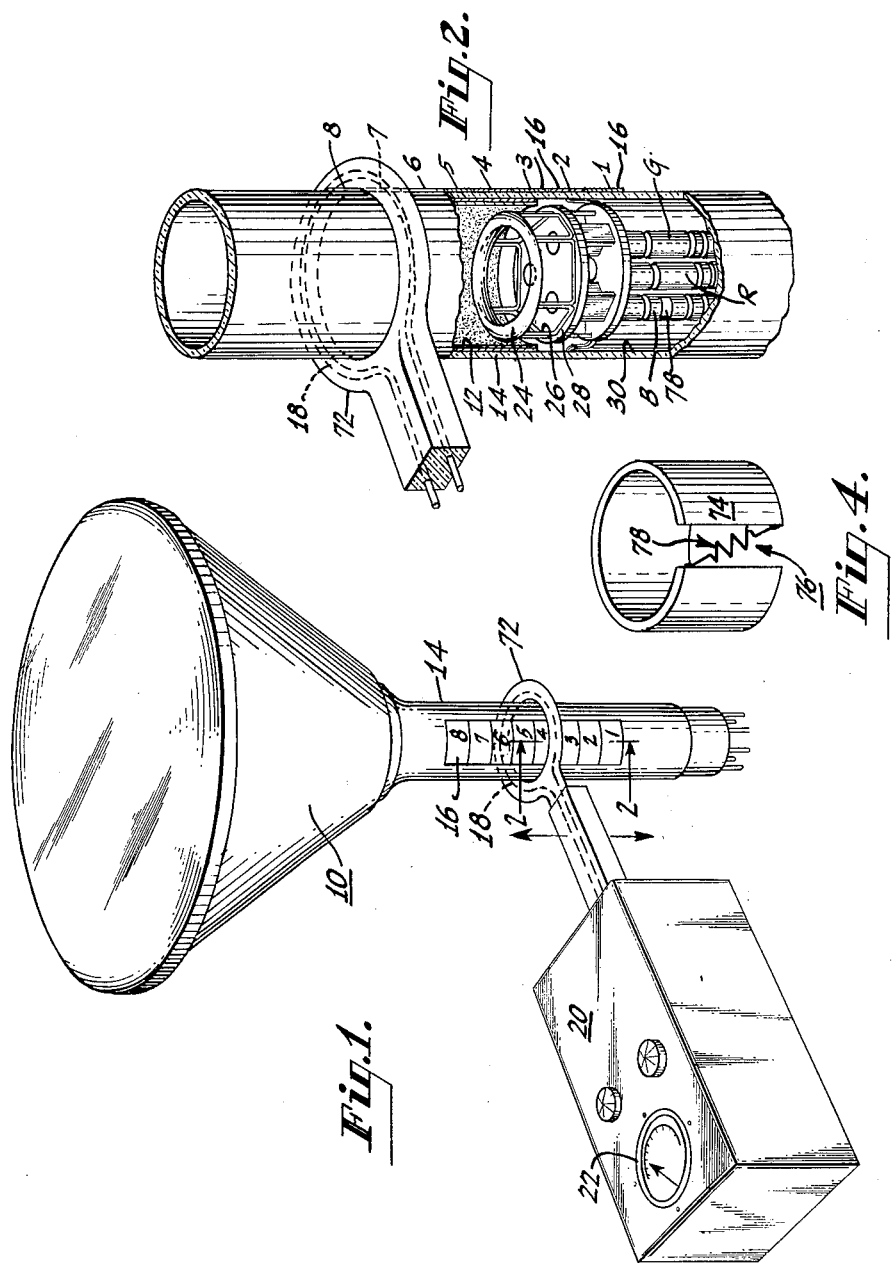

INVENTOR.
RICHARD L. SPALDING
BY
Roderick Malcolm
ATTORNEY

United States Patent Office
2,979,371
Patented Apr. 11, 1961

2,979,371
ART OF MAKING AND TESTING GETTERED ELECTRON TUBES

Richard L. Spalding, Lancaster, Pa., assignor to Radio Corporation of America, a corporation of Delaware Original application Dec. 11, 1959, Ser. No. 858,935. Divided and this application June 17, 1960, Ser. No. 36,954

5 Claims. (Cl. 316—30)

This is a division of application Serial No. 858,935, filed December 11, 1959.

This invention relates to the solution of certain problems encountered in manufacturing and testing electron-tubes constituted in whole or in part of glass and containing a flashable metallic getter.

The problems with which the invention is especially concerned are "underflashing" and "overflashing" of the getter. Underflashing shortens the life of an electron tube by failure to provide a sufficient quantity (milligrams) of getter, in its gas-absorbing (metallic) state. Overflashing may result either (i) in a cracked envelope, or (ii) in the destruction of the getter "cup," in which latter case the life of the tube may be impaired either (a) by a short-circuit resulting from loose particles of the cup material striking some current carrying element of the tube, or (b) by "blanketing" the film of gas-absorbing getter material with a coating of vaporized cup metal.

Accordingly, an object of the present invention is to provide an improved method of gettering and one which shall minimize the possibility of underflashing and overflashing.

Another and important object of the invention is to provide a non-destructive method of testing gettered electron tubes to ascertain the quantity of useful getter herein, and one which shall provide (a) an accurate indication of the prospective life of such tube irrespective of its age at the time of the test and (b) by a comparison of data obtained from the test of the same tube at different dates, an accurate indication of the rate at which gas was evolved within, or leaked into, that tube.

In connection with the above-mentioned object it will be recalled that, up to now, the only way of ascertaining the quantity of flashed getter material in an evacuated envelope has been to break the vacuum and subject the getter material to titration. While such a destructive test has its uses, the informaion available from titration tests can be useful only when derived from a newly gettered tube. That is to say, titration tests will show the same amount of barium (for example) in a used or "worn out" tube as in a newly flashed tube. This is so because in titration tests the chemicals react with the barium ion in any form, e.g., oxide, hydroxide, or pure metal. As will hereinafter more fully appear, the apparatus and the non-destructive method of the present invention by responding only to the getter material which is in its useful (gas-absorbing) metallic state provides the tube-manufacturer with information, not heretofore available, of a kind which leads to a better product.

Another and related object is to provide a simple, inexpensive, compact and trouble-free apparatus for practicing the aforesaid gettering and testing methods of the invention.

Stated generally, the foregoing and related objects are achieved in accordance with the invention by electrically measuring the quantity or density of the conductive film which is deposited, in vaporizing the getter, upon a portion of the inner surface of the evacuated envelope, and utilizing the resulting electrical measurement as a measure of the quantity of useful getter material within said envelope. The electrical measurements involved in practicing the invention are made from the exterior of the tube without breaking its vacuum and can be taken either subsequent to the time the getter has been flashed or while it is being flashed. In this latter case means are provided for automatically turning-off the flasher upon achieving an electrical measurement indicative of the presence of a desired useful quantity of gas-absorbing getter material upon the appropriate portion or portions of the inner surface of the envelope.

The invention is described in greater detail in connection with the accompanying two sheets of drawings, wherein:

Fig. 1 is a view in perspective of a gettered, sealed-off cathode-ray tube undergoing a non-destructive test to determine the quantity of useful getter material therein; the test equipment and the method of using the same being within the spirit and scope of the invention;

Fig. 2 is a fragmentary sectional view of the tube-neck and of the applicator of the test equipment, the sectional portion of the tube-neck being taken on the line 2—2 of Fig. 1;

Fig. 4 is a view in perspective of a form of "load" device which may be employed in calibrating the meter of the test equipment of Fig. 1;

Figure 3:
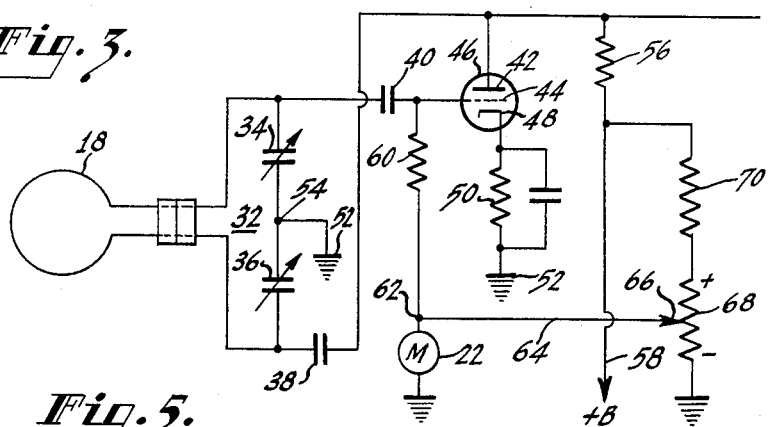
Fig. 3 is an electrical diagram of one form of oscillator circuit for the test equipment of Fig. 1.

In Figs. 1 and 2 the invention is illustrated as applied to the testing of a previously gettered cathode-ray tube 10 (which, in the instant case, is a 3-gun, tri-color kinescope) to determine the quantity of useful getter therein.

As shown in Fig. 2, the flashed getter metal (say, barium) is shown condensed in the form of a cylindrical film 12 on the inner surface of the tube-neck 14 within the region defined by the calibrations 1–8 on a strip of paper tape 16. The test involves the effects of the presence (or absence) of predetermined quantities of the getter metal 12 upon a high-frequency electric field which is applied successively to the regions 1—2, 3—4 etc. by an exploring coil 18 as it is moved along the neck 14 in the direction of the arrows. The coil 18 is energized by an ultra-high frequency oscillator 20 (later described in connection with Fig. 3) and the effects of the presence of various quantities of the metal 12 upon said oscillator are visually indicated on the scale of a suitably calibrated meter 22 which, in the instant case, will be understood to be a microammeter.

As above indicated, to render the tube 10 susceptible to the testing method of the present invention, it is of course necessary that the getter be of the metallic variety (e.g., Ba-Mg, Ba-Mg-Al, Ba-Al, Ba-Sr-Al, etc.) and the getter cup 24 must be so designed, positioned and arranged within the envelope that the metallic vapor which is released upon flashing the getter is deposited upon the inner surface of the envelope in a position to influence the field of the coil 18.

The (known) getter structure shown in Fig. 2 meets all of the above-mentioned requirements. Here the getter structure comprises a hollow-metal ring or "cup" 24 supported by upstanding arms 26 on the apertured end plate 28 of a battery of three electron guns R, B, and G, which are arranged delta (Δ) fashion about the long axis of the tube, as is conventional in tri-color kinescopes. The hollow ring-like "cup" 24 will be understood to contain a filling of barium, or other metallic getter and in this case, to be of the "up-flashing" variety; the upward or upward-and-outward direction of its flash being fixed by weakening the wall of the "cup" in the part facing the area of the neck 14 upon which the metallic vapor is to be deposited. The container 24 for the getter need not be circular, but is preferably, but not necessarily, one which, when flashed, will provide a closed path for the U.H.F. currents applied thereto by the coil 18. "Flag" and "horseshoe" type getters can be used, but the exploring coil 18 should then be arranged parallel to the flashed material, instead of surrounding it.

It may be well here to mention that where the tube under test is provided with a "second-anode" in the form of a resistive coating 30 (Fig. 2), constituted, for example, of graphite or of aluminum oxide, on the inner surface of the glass beneath the getter deposit 12, said coating 30 should have a direct current resistance of not less than 125 ohms per square inch. Resistances lower than this may increase the loading of the oscillator 20 to such an extent that the accuracy of the measurements of the quantity or area of the barium deposit 12 (Fig. 1) as indicated on the meter 22, may be adversely affected.

Fig. 3 shows one type of oscillator which may be used in the practice of the invention. Here the oscillator tank circuit 32, which comprises the exploring coil 18 and the tuning capacitors 34 and 36, operates at any suitable, fixed, high-frequency such as 85 mc., for example. The tank circuit 32 is connected through coupling capacitors 38 and 40 with the anode 42 and the grid 44, respectively, of the oscillator tube 46. The cathode 48 of the oscillator tube 46 is connected through a self-bias resistor 50 with common ground 52, and thence to the grounded midtap 54 between the tuning capacitors 34 and 36, to complete the oscillator circuit. (This type of oscillator is shown only by way of example. Any suitable oscillator circuit to which an exploring coil 18 may be attached, may be used.)

Anode operating current is supplied to the anode 42 through an anode resistor 56 from the +B supply line 58 which will be understood to be connected with a conventional power supply circuit, not shown.

The grid 44 is connected to ground through a grid resistor 60 and the current responsive meter 22, which is calibrated in a manner later described.

The bias potential developed in the cathode resistor 50 is applied between the cathode and the grid, and is such that the strength of the oscillations in the tank circuit 32 is at a predetermined minimum level. To increase the strength of the oscillations or the sensitivity of the circuit, a positive bias potential is variably introduced at the terminal 62 in the grid circuit between the meter 22 and the grid resistor 60 through a lead 64, connected with the movable contact 66 of the potentiometer 68 across which is provided a potential, of the polarity indicated, from a suitable source of supply. In the present example, the resistor of the potentiometer 68 is connected in series with a potential-dropping resistor 70 to the positive supply lead 58. With the potentiometer 68 connected to ground, the movable contact 66 provides a sensitivity control wherein an increase in the positive bias applied to the grid 44 through the lead 64 and the bias resistor 60, serves to increase the strength of oscillations as the fixed negative bias provided by the cathode resistor 50 is overcome. In other words, the strength of the oscillations or the sensitivity of the circuit is increased as the positive bias on the grid is increased.

When a metallic or other conducting body such as the getter film 12 (Fig. 1) is placed within the field of the coil 18 it is effectively a load inductively coupled over into the tank circuit 32 and, as the load increases, it cuts down the strength of the oscillations in the tank circuit 32 and causes the grid current flowing in the meter to be reduced.

It is desirable that the mutual coupling between the metallic film or "load" 12 (Fig. 1) and the coil 18 be less than optimum in order that the frequency of oscillation of the oscillator circuit 32 will not change during the test. In other words, it is desirable that the coil 18 be dimensioned to provide effectively loose inductive coupling with the getter film 12. The coil 18 then operates as the primary winding of a transformer of which the secondary is the more or less conductive body or film of material being explored or measured. As the coil 18 is moved along the region 1–8 (Fig. 1) of the tube-neck 16 the variations in loading are reflected in the variations in the resulting grid current which is indicated by the meter 22, the calibration of which will hereinafter be discussed.

In order to establish the "loose" inductive coupling mentioned in the preceding paragraph, and to maintain such coupling substantially constant as the coil 18 is moved along the neck of the tube, the coil is preferably embedded in an annulus 72 (see Figs. 1 and 2) constituted of insulating material (e.g., methyl methacrylate resin or "Lucite"). The internal diameter of the annulus 72 is just sufficient to permit it to be entered upon and moved along the glass neck 16 without "wobbling" and the coil 18 is spaced from the inner periphery of the annulus a distance of, say, 0.185" to provide the satisfactorily loose coupling with the getter deposit or "load" 12. As shown in Fig. 2, this "applicator" i.e., the exploring coil 18 and its insulating supporting annulus 72) is preferably detachable from the oscillator housing 20 to permit the use of applicators of other forms or dimensions, as may be required in testing evacuated envelopes of other types.

In the following specific example of the application of the method and apparatus of the invention to the testing for getter content of a 21" color-kinescope it had already been determined empirically that when a tube of this type contains from 9 to 140 milligrams of barium, in its flashed metallic state, it will possess a satisfactorily long tube-life under ordinary operating conditions. Accordingly, it is necessary to establish a correlation between the meter-readings and this particular (90 to 140 mg.) "standard." This involves the following steps:

*Calibration*

The unit 20 is turned on and allowed to warm up for a minimum of five minutes. A calibration standard comprising a sheet-copper collar 74 (Fig. 4) of the same diameter (2¼") as the tube neck, and having an air-gap 76 bridged by a resistor 78 (in this case, 12 ohms) is inserted within the coil 18 with the air-gap 76 directly opposite the legs of the coil. The calibration standard is moved up and down in a path perpendicular to the plane of the coil while adjusting the sensitivity control of the oscillator to obtain a minimum reading (in this case, 12 units) on the dial. The calibration standard is then removed and, the line-voltage supply being constant, a reading of 100 is obtained on the meter by a proper selection of circuit values.

*Test procedure*

A 7 inch by 1 inch strip of paper tape 16 (Fig. 1) is marked with lines 1–8 starting 1⅛" from one end and then spaced at ½" intervals to make a total of eight lines. The tape is then attached to the neck of an unflashed tube so that the first drawn line is 1⅛" from the upper edge of the blue lateral pole piece "box" 78 on the "blue" gun B. Eight readings, using each of the aforesaid lines as coil references, are taken on this unflashed tube to establish a "base line" indicative of the degree of loading on the oscillator before its getter has been flashed. In this case, because of the presence of a graphite coating 30 (Fig. 2) the meter reading was "80" at all eight lines on the tape. After the getter is flashed, meter readings are taken and recorded at the same areas (1 to 8) along the masking tape 16. Next, these last-mentioned readings are subtracted from 80 (the above-mentioned "base line") for each of the eight positions along the neck, and the remainders summed thus:

| Position | 1 | 2 | 3 | 4 | 5 | 6 | 7 | 8 |
|---|---|---|---|---|---|---|---|---|
| A. Base Line | 80 | 80 | 80 | 80 | 80 | 80 | 80 | 80 |
| B. Readings | 76 | 59 | 52 | 43 | 36 | 19 | 10 | 6 |
| Remainder A−B | 4 | 21 | 28 | 37 | 44 | 61 | 70 | 74 |

Unit area=339.

Figure 5:
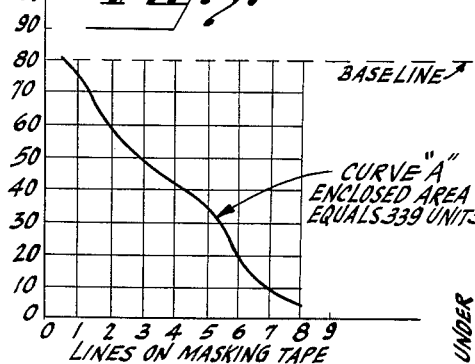
Fig. 5 is a chart showing typical meter readings taken on a tri-color kinescope in the manner illustrated in Figs. 1 and 2.
Figure 6:
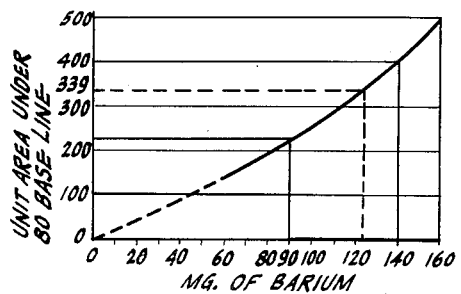
Fig. 6 is a chart which will be referred to in translating the meter readings of Fig. 5 into terms of milligrams of metallic getter.

The sum of these numbers (339 in this case) represents the units of area under the previously mentioned "base line" (80) of the unflashed tube. This is shown in the chart of Fig. 5 wherein the area enclosed in the space between the "base line" 80 and the curve A embraces 33.9 squares or "units" of area on the decimal scale of the chart. In order to convert "units of area" into milligrams of barium it is necessary empirically to derive (e.g., by titration) a correlation curve for this particular tube-type. Such a curve is shown in Fig. 6 wherein the ordinate is marked with a scale extended to include the maximum number (in this case 160) of milligrams encountered in such a tube, and the abscissa is marked to include the maximum number of units of area possible with a base line of 80. Since in the foregoing example, the number of "units" of area was observed to be "339" this number is projected onto the "standard" curve of Fig. 6 where it will be seen to represent 125 milligrams of barium. Because, as previously mentioned, a tube of this type containing from 90 to 140 mg. of barium will exhibit a satisfactorily long tube-life, this particular tube passed the test.

*The getter-flasher control system (Fig. 7)*

Figure 7:
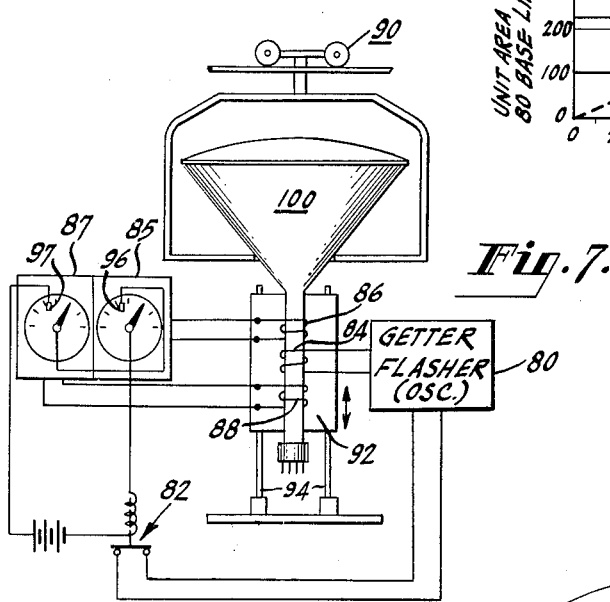
Fig. 7 is a partly diagrammatic schematic view of a getter flashing apparatus having a control system constructed in accordance with the principle of the invention and applied to the manufacture of cathode-ray tubes.

The possibility of the occurrence of "underflash" and "overflash" is minimized, in accordance with the invention, by using one or more of getter-testing units similar to the one shown in Figs. 1 and 3 to control the operation of the getter-flasher 80 (Fig. 7) through the medium of a relay 82. Such an installation is illustrated in Fig. 7, wherein the getter-flasher coil 84 and the "getter-testing" coil 86 or coils 86 and 88 of the control units 85 and 87 therefor are shown at a point or "station" along a factory conveyor 90 whereat the tube, which is here designated 100, has already been sealed off, pumped, and based, but its getter not yet flashed. The getter-flasher per se may be a conventional "induction furnace," and includes a coil 84 which is of a diameter slightly greater than required to surround the tube-neck so that it may be brought into inductive-heating relationship with the getter. The getter-flashing coil 84 is supplied with exciting current from an oscillator 80 (details not shown) operating at a frequency (of say, one megacycle) which has substantially no effect upon the field of the "getter-testing" coils 86 and 88 of the control system for the flasher. All of these coils (84, 86, and 88) are supported along a common vertical axis upon a panel 92 which is mounted for vertical movement, as on tracks 94 beneath the conveyor 90, so that said coils may be moved either manually or automatically into (a stationary) position about the neck of the tube when it reaches the appropriate "station" of the conveyor.

Good results have been achieved with the relay 82 in the getter-flashing oscillator circuit under the control of but a single getter-testing unit. However, in the interests of accuracy two or more such units may be employed. In the latter case, if the tube contains an "up-flashing" getter (as in Fig. 2) the test-coils 86 and 88 should preferably, but not necessarily, both be arranged above the getter-flashing coil 84. If the tube contains both an "up-flashing" and a "down-flashing" getter, at least one test-coil should be allotted to each getter deposit, in which case at least one test-coil should be arranged above the getter flashing coil 84 and the other or others beneath it—as shown in Fig. 7. In all plural test-coil installations the electrical contacts 96 and 97 which control the actuation of the relay 82 in the circuit of getter-flashing oscillator 80 should preferably be arranged in series (as shown in Fig. 7) so that the relay 82 will operate to halt the getter-flashing operation only when the tube-area within the field of each test-coil receives its quota of gas-absorbing getter material.

What is claimed is:

1. Apparatus for use in ascertaining the quantity of flashed getter material on the inner surface of an evacuated envelope which, normally, has been subjected to the flash of a flashable metallic getter, said apparatus comprising: a high-frequency oscillator having an output circuit including an inductance coil adapted to be disposed adjacent to an area of said surface upon which the metallic vapor released upon flashing said getter has been deposited, and means cooperatively associated with said oscillator for measuring the effect upon its oscillations of the presence of said metallic deposit within the field of said inductance coil.

2. Apparatus for gettering an evacuated glass envelope containing a metallic getter so positioned within said envelope that the metallic vapor released upon flashing the getter is deposited upon the inner surface of said envelope, said apparatus comprising: means for flashing said getter, a radio frequency oscillator having an output circuit including an inductance coil adapted to be disposed adjacent to the area of said envelope upon which said metallic vapor is deposited, and means responsive to the effect upon said oscillator of the presence of said metallic deposit within the field of said coil for controlling the operation of said getter flashing means.

3. Apparatus for gettering a cathode-ray tube having a neck containing a flashable metallic getter, said apparatus comprising a getter-flashing coil adapted to encircle said neck adjacent to said getter, means for energizing said getter-flashing coil to flash said getter and hence to deposit its metallic vapor upon an inner surface portion of said neck, and means responsive to the presence of a desired quantity of said metallic deposit upon said inner surface portion of said neck for deenergizing said getter-flashing coil.

4. The invention as set forth in claim 3 wherein said last-mentioned means comprises a high-frequency oscillator having an output circuit including an inductance coil adapted to encircle said tube-neck adjacent to the portion thereof upon which said metallic vapor is deposited and thus to alter the operating condition of said oscillator as determined by the quantity of said metallic deposit within the inductive field of said inductance coil.

5. The invention as set forth in claim 4 and including a relay responsive to said alterations in the operating condition of said oscillator and connected between said oscillator and the energizing means for said getter-flashing coil.

No references cited.